(12) United States Patent
Morrison et al.

(10) Patent No.: US 12,355,322 B2
(45) Date of Patent: Jul. 8, 2025

(54) RETRACTABLE BUTTONS FOR A USER INPUT DEVICE OF AN INFORMATION HANDLING SYSTEM

(71) Applicant: Dell Products L.P., Round Rock, TX (US)

(72) Inventors: Jason Scott Morrison, Chadron, NE (US); Erik Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 403 days.

(21) Appl. No.: 17/647,852

(22) Filed: Jan. 13, 2022

(65) Prior Publication Data

US 2023/0223830 A1 Jul. 13, 2023

(51) Int. Cl.
*H02K 33/18* (2006.01)
*H02K 33/16* (2006.01)

(52) U.S. Cl.
CPC ............ *H02K 33/18* (2013.01); *H02K 33/16* (2013.01)

(58) Field of Classification Search
CPC .................................................. H02K 33/16
See application file for complete search history.

(56) References Cited

U.S. PATENT DOCUMENTS

| | | | | |
|---|---|---|---|---|
| 5,184,037 A | * | 2/1993 | Kobayashi | H10N 35/00 310/26 |
| 10,797,699 B1 | * | 10/2020 | Morrison | H01H 36/004 |
| 2004/0150277 A1 | * | 8/2004 | Moriyasu | H02K 33/18 310/15 |
| 2006/0145797 A1 | * | 7/2006 | Muramatsu | F04B 17/042 335/220 |
| 2018/0277292 A1 | * | 9/2018 | Zarate | G09B 21/004 |
| 2019/0041995 A1 | * | 2/2019 | Kotta | H03K 17/972 |
| 2020/0211418 A1 | * | 7/2020 | Greiner | G09B 21/003 |
| 2021/0287569 A1 | * | 9/2021 | Moon | G09B 21/004 |
| 2023/0197323 A1 | * | 6/2023 | Valverde | H01F 7/04 335/284 |

* cited by examiner

*Primary Examiner* — Bernard Rojas
(74) *Attorney, Agent, or Firm* — Norton Rose Fulbright US LLP

(57) ABSTRACT

This disclosure describes systems, devices, apparatuses, and methods of retracting or extending a button, such as a depressible button, pad, joystick, trigger, or bumper. The button can include a movable structure with magnets at two positions and a coil that can be energized to create a magnetic field. The button can be configured to retract when a current is applied to the coil, and to extend when a different current is applied to the coil. The button can include a magnetic core that can latch to a magnet when the button is retracted and that can latch to a different magnet when the button is extended. In some configurations, the button is configured to retract or extend relative to a printed circuit board, a housing, or both.

19 Claims, 12 Drawing Sheets

RETRACTABLE BUTTONS FOR A USER INPUT DEVICE OF AN INFORMATION HANDLING SYSTEM

FIELD OF THE DISCLOSURE

This disclosure relates to user input devices and systems. More specifically, portions of this disclosure relate to retractable buttons for computer devices or other gaming systems.

BACKGROUND

As the value and use of information continues to increase, individuals and businesses seek additional ways to process and store information. One option available to users is information handling systems. An information handling system generally processes, compiles, stores, or communicates information or data for business, personal, or other purposes—which allows users to capitalize on the value of the information. Because technology and information handling needs and requirements vary between different users or applications, information handling systems may also vary over what information is handled, how the information is handled, how much information is processed, stored, or communicated, and how quickly and efficiently the information may be processed, stored, or communicated. The variations in information handling systems allow for information handling systems to be general or configured for a specific user or specific use (such as financial transaction processing, airline reservations, enterprise data storage, or global communications). In addition, information handling systems may include a variety of hardware and software components that may be configured to process, store, and communicate information and may include one or more computer systems, data storage systems, and networking systems.

A user may interact with information handling systems through hardware components configured as user input devices and software configured to process input from the user input devices. User input devices, including handheld videogame controllers, are used when operating various computer applications to enable users to provide input to operate various functions of the computer application. For example, a gaming controller can operate with a gaming device to enable a user to provide input into an application, such as a video game, to control an object or character, select audio or video content, or otherwise control aspects related to the gaming device. Thus, gaming controllers typically include multiple buttons, such as depressible buttons, pads, joysticks, triggers, or bumpers. The user may also receive feedback from the application through the user input device. The input device may give feedback to the user based on a signal transmitted by the information handling system to the input device. For example, the input device can apply a force, vibration, or motion in response to a game event.

SUMMARY

According to embodiments of this disclosure, a gaming controller or other user input device may include at least one retractable button. Retractable buttons may be raised or lowered with respect to a surface of the user input device to change the tactile feel of the buttons. The raising or lowering of the buttons may also or alternatively configure whether the buttons can be used by the user. For example, a raised button may be clickable by a user whereas a lowered button may be locked out and prevent a user from clicking the button. When several buttons are used in an array of buttons on a user input device, the user input device can be configured for different applications, such as whether a certain application or game executing on an information handling system is expecting user input from two buttons (e.g., an A and B button) or is expecting user input from four buttons (e.g., an A, B, X, and Y button).

In one configuration of a retractable button according to aspects of this disclosure, the retractable button can include a first magnet, a second magnet, a coil positioned between the first magnet and the second magnet, a spacer coupled at one end to the first magnet, coupled at an opposite end to the second magnet, and configured to arrange the first magnet on one side of the coil and the second magnet on an opposite side of the coil, and a cap coupled to the spacer over the first magnet. The spacer can be configured to move relative to the coil. In some embodiments, the button can include a haptic component coupled to the cap and coupled to the first magnet. In some embodiments, the button can include a controller coupled to the coil. The controller can be configured to extend the cap by applying a first current to the coil to generate a magnetic field that repels the first magnet and attracts the second magnet and to retract the cap by applying a second current to the coil to generate a magnetic field that attracts the first magnet and repels the second magnet. The button can include a core In some embodiments, an apparatus includes a first magnet; a second magnet; a coil positioned between the first magnet and the second magnet; a spacer coupled at one end to the first magnet, coupled at an opposite end to the second magnet and configured to arrange the first magnet on one side of the coil and the second magnet on an opposite side of the coil; and a cap coupled to the spacer over the first magnet.

In some embodiments, the apparatus may further include a haptic component, such as a rubber dome, metal dome, or tactile switch, coupled to the cap and coupled to the first magnet.

In some embodiments, the apparatus may further include a magnetic core positioned between the first magnet and the second magnet, wherein at least a portion of the coil is positioned around the magnetic core.

In some embodiments, the magnetic core may be configured to latch to the second magnet when the cap is extended; and latch to the first magnet when the cap is retracted.

In some embodiments, the apparatus may further include a first backing plate coupled to the first magnet; and a second backing plate coupled to the second magnet.

In some embodiments, the apparatus may further include a controller coupled to the coil, wherein the controller is configured to: apply a first current to the coil; and apply a different, second current to the coil.

In some embodiments, the controller may be configured to: extend the cap by applying the first current to the coil to generate a magnetic field that repels the first magnet and attracts the second magnet; and retract the cap by applying the second current to the coil to generate a magnetic field that attracts the first magnet and repels the second magnet.

In some embodiments, the apparatus may further include a magnetic core positioned between the first magnet and the second magnet, wherein at least a portion of the coil is positioned around the magnetic core, and the controller is configured to apply the first current to the coil as a current pulse; and apply the second current to the coil as a current pulse.

In some embodiments, the controller may be configured to apply the second current with an amplitude and a duration to maintain the magnetic core and the first magnet fixed relative to each other when the second current is removed from the coil.

In some embodiments, the first magnet, the second magnet, the coil, the spacer, and the cap may comprise a first button, and the apparatus may include an array of buttons including the first button.

In some embodiments, the cap of at least one button may further include a haptic component coupled to the cap and coupled to the first magnet of the button.

In some embodiments, the apparatus may further include a printed circuit board coupling the buttons of the array of buttons; a housing at least partially enclosing the printed circuit board; wherein at least one button is configured to be independently extended or retracted relative to the PCB or the housing, or both.

In some embodiments, the apparatus may further include a controller coupled to the array of buttons, wherein the controller is configured to independently extend at least one button of the array of buttons by applying a first current to the coil to generate a magnetic field that repels the first magnet and attracts the second magnet; and independently retract at least one button of the array of buttons by applying a second current to the coil to generate a magnetic field that attracts the first magnet and repels the second magnet.

In some embodiments, a gaming controller may include an array of buttons, at least one button of the array of buttons configured to extend to a first configuration and retract to a second configuration, the at least one button may include: a first magnet; a second magnet; a coil positioned between the first magnet and the second magnet; a spacer coupled at one end to the first magnet, coupled at an opposite end to the second magnet and configured to arrange the first magnet on one side of the coil and the second magnet on an opposite side of the coil; and a cap coupled to the spacer over the first magnet; and a controller coupled to the array of buttons, wherein the controller is configured to: extend the at least one button of the array of buttons by applying a first current to the coil to generate a magnetic field that repels the first magnet and attracts the second magnet; extend the at least one button of the array of buttons by applying a second current to the coil to generate a magnetic field that attracts the first magnet and repels the second magnet; and to determine user input to the array of buttons.

In some embodiments, the gaming controller's array of buttons may further include at least a second button configured to extend to the first configuration and retract to the second configuration; and the controller may be coupled to the at least one button and the at least a second button and may be configured to reconfigure the at least one button and the at least a second button between the first configuration and the second configuration together.

In some embodiments, at least one button may further include a magnetic core positioned between the first magnet and the second magnet, wherein at least a portion of the coil is positioned around the magnetic core, and wherein the magnetic core is configured to: latch to the second magnet when the cap is extended; and latch to the first magnet when the cap is retracted.

In some embodiments, the controller may be configured to apply a first profile to extend a first set of one or more buttons and retract a second set of one or more buttons and configured to apply a second profile to extend a third set of one or more buttons and retract a fourth set of one or more buttons.

One embodiment may include applying a first current to a coil positioned between a first magnet and a second magnet to move a spacer to extend a cap, wherein the first current generates a magnetic field from the coil that repels the first magnet coupled to one end of the spacer and attracts the second magnet coupled to an opposite end of the spacer; and applying a different, second current to the coil positioned between the first magnet and the second magnet to move the spacer to retract the cap, wherein the second current generates a magnetic field that attracts the first magnet and repels the second magnet.

Another embodiment may further include latching a magnetic core to the second magnet to fix the spacer in an extended position; and latching the magnetic core to the first magnet to fix the spacer in a retracted position.

Another embodiment further includes receiving an input from an information handling system; wherein the first current is applied when the input is a first input and wherein the second current is applied when the input is a second input.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed configuration, the terms "substantially" and "approximately" may be substituted with "within [a percentage] of" what is specified, where the percentage includes 0.1, 1, 5, and 10 percent.

The phrase "and/or" means "and" or "or." To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention so that the detailed description that follows may be better understood. Additional features and advantages will be described hereinafter that form the subject of the claims of the invention. It should be appreciated by those having ordinary skill in the art that the conception and specific embodiment disclosed may be readily used as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

The following drawings illustrate by way of example and not limitation. For brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

Figure 1:
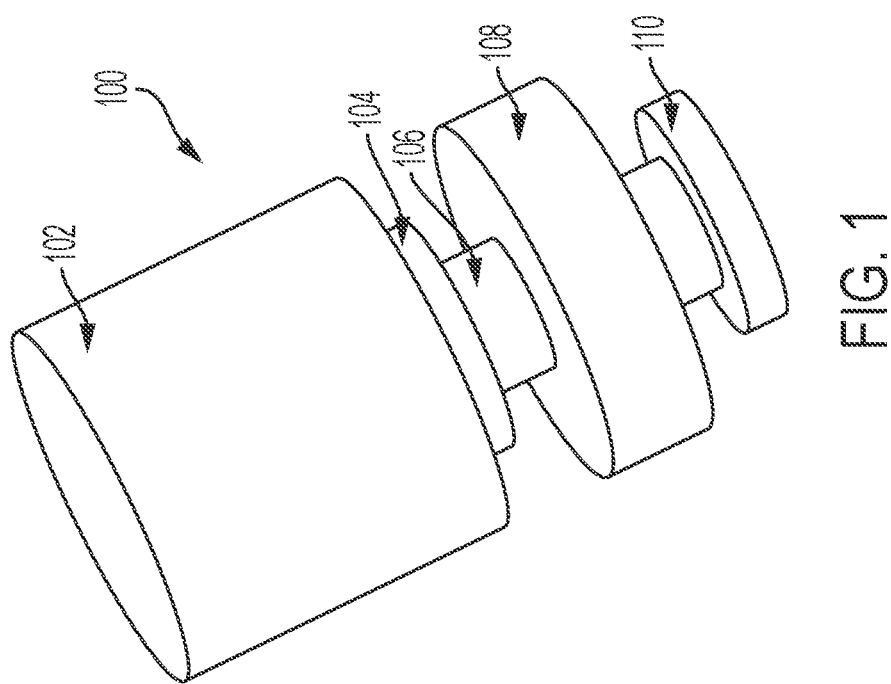
FIG. 1 is a perspective view of an example of a button according to one or more aspects of the present disclosure.

This disclosure describes systems, devices, apparatuses, and methods of retracting or extending a button, such as a depressible button, pad, joystick, trigger, or bumper. Users generally interact with an information handling system through hardware components configured as user input devices. The user may operate functions within the information handling system's application by using the user input device to provide input into the application. The user may also receive feedback from the application through the user input device. This two-way communication between the user and the system enables application developers to offer more features to the user and to provide a more immersive experience to the user, which in turn may improve the user's performance and enjoyment when using the application.

User input devices, such as handheld videogame controllers and keyboards, usually have a predetermined number of buttons (e.g., depressible button, pad, joystick, trigger, or bumper). Yet, applications, such as video games, vary in the number of buttons required to operate the functions within the application. Shortcomings mentioned here are only representative and are included to highlight problems that the inventors have identified in existing user input devices and interaction with information handling systems and sought to improve upon. Aspects of the devices and systems described below may address some or all of the shortcomings as well as others known in the art. Aspects of the devices and systems described below may present other benefits than, and be used in other applications than, those described.

Gaming controllers may have up to fourteen (or more) buttons (to accommodate up to fourteen functions). While some games may use all fourteen buttons, other games may only require one or two buttons (e.g., one button to jump and one button to hit). And many games fall somewhere in between. Moreover, even within one game, the number of buttons used often varies throughout the different stages of the game. For example, the button used to run and the button used to jump may be temporarily disabled while the character is lifting a heavy object or while the character is in a crouching position. As another example, one button may be active while the character is walking but disabled while the character is flying. As a result, at any given time, the player of a game—or user of an application—may have available more buttons than the player needs. Because there are too many buttons accessible, a player (or user) starting to play a new game (or starting to use a new application) may have difficulty learning what buttons should be use at any given time. And because all of the buttons are accessible, even an experienced player may attempt to use a temporarily disabled button or mix up the buttons required by one game with the buttons required by another game. User input devices with retractable buttons according to aspects of this disclosure allow user and game-driven customizations that provide an improved user experience when operating the user input device and when interacting with an information handling system.

Figure 2:
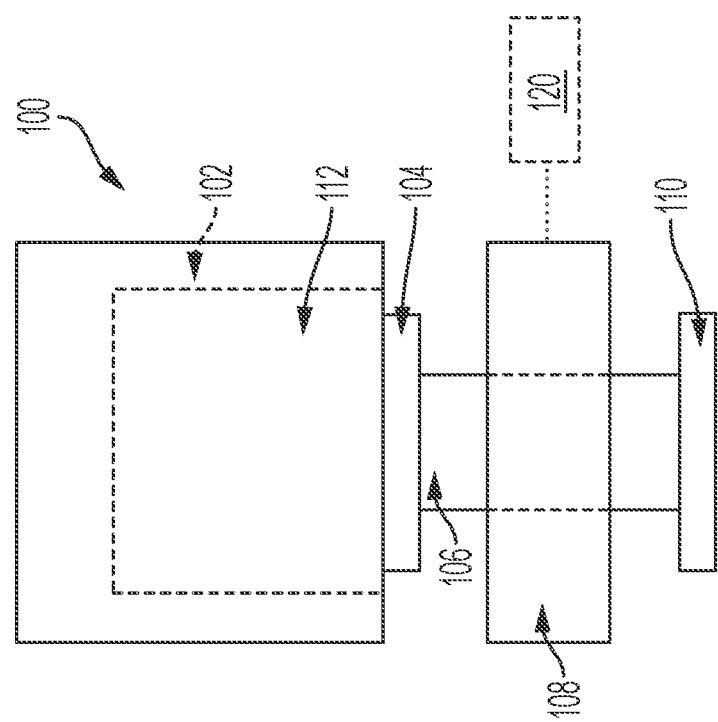
FIG. 2 is a side-view diagram of an example of the button of FIG. 1.

Referring to FIG. 1, shown is an example of a button 100 according to one or more aspects of the present disclosure. As shown in FIG. 2, the button 100 includes a first magnet 104 (e.g., a permanent magnet), a second magnet 110 (e.g., a permanent magnet), a coil 108 positioned between the first magnet 104 and the second magnet 110, a spacer 106 coupled at one end to the first magnet 104, coupled at an opposite end to the second magnet 110, and configured to arrange the first magnet 104 on one side of the coil 108 and the second magnet 110 on an opposite side of the coil 108, and a cap 102 coupled to the spacer 106 over the first magnet 104. In some configurations, the button 100 can include—but need not include—a haptic component 112 coupled to the cap 102 and coupled to the first magnet 104. In some configurations, the button 100 can include—but need not include—a controller 120 coupled to the coil 108.

The first magnet 104 and the second magnet 110 may be any material that retains its magnetization in the absence of a re-polarizing magnetic field. These magnets (104 and 110) may be made of ferromagnetic or ferrimagnetic materials, such as—for example—iron (Fe), aluminum (Al), nickel (Ni), cobalt (Co), copper (Cu), titanium (Ti), alnico, rare-earth metals, lodestone, and ferrite. Moreover, these magnets (104 and 110) need not be made of the same material. In other words, the first magnet 104 may be made of one material and the second magnet 110 may be made of a different material. In some embodiments, the magnets 104 and 110 may be electromagnets. The first magnet 104 and the second magnet 110 may have any shape—and the first magnet 104 and the second magnet 110 need not have the same shape. For example, in FIG. 1, both the first magnet 104 and the second magnet 110 have solid cylindrical shapes. These magnets (104 and 110) may have any shape, including—but not limited to—a cuboid, hexagonal prism, triangular prism, or pentagonal prism. Further, these magnets (104 and 110) need not be solid shapes. The magnets (104 and 110) may be, for example, hollow—such as a hollow cylinder, hollow cuboid, hollow hexagonal prism, hollow triangular prism, or hollow pentagonal prism.

The spacer 106 is coupled at one end to the first magnet 104, coupled at an opposite end to the second magnet 110, and configured to arrange the first magnet 104 on one side of the coil 108 and the second magnet 110 on an opposite side of the coil 108. In this embodiment, the spacer 106, the first magnet 104, and the second magnet 110 have a cylindrical shape. The bottom face of the first magnet 104 may be attached to the top face of the spacer 106 and the top face of the second magnet 110 is attached to the bottom face of the spacer 106. The spacer 106 is configured to move relative to the coil 108, such as to extend or retract the cap 102. Specifically, the spacer 106 is configured so that when the spacer 106 moves in a first direction, the first magnet 104 moves away from the coil 108 and the second magnet 110 moves towards the coil 108. In this configuration, the button 100 is being extended, which raises a surface of the cap 102. The spacer 106 is configured so that when the spacer 106 moves in a second, opposite direction, the first magnet 104 moves towards the coil 108 and the second magnet 110 moves away from the coil 108. In this configuration, the button 100 is being retracted, which lowers the surface of the cap 102. In this embodiment, the spacer 106 is configured to move through the coil 108. The spacer 106 may, for example, slide (in a plunger-like motion) through the coil, but the spacer 106 need not move through the coil 108. The spacer 106 may, for example, be positioned around the coil 108—while still being configured to move relative to the coil 108. Like the magnets (104 and 110), the spacer 106 may have any shape—and need not have the same shape as either one of the first magnet 104 or the second magnet 110. For example, the spacer 106 may be a cylinder (as in FIG. 1), cuboid, hexagonal prism, triangular prism, or pentagonal prism. And just like the magnets (104 and 110), the spacer 106 need not be a solid shape. The spacer 106 may be, for example, hollow—such as a hollow cylinder, hollow cuboid, hollow hexagonal prism, hollow triangular prism, or hollow pentagonal prism. Furthermore, the spacer 106 need not be one single piece. The spacer 106 may, for example, consist of multiple pieces coupled to each other in series, consist of multiple pieces individually coupled to the magnets (104 and 110), or consist of multiple pieces coupled to each other to create a single structure that is coupled to the magnets (104 and 110). For example, the spacer 106 may be multiple hollow cylinders in series positioned through the coil 108, multiple hollow cylinders parallel to each other and positioned through the coil 108, a hollow cuboid (made of one or more pieces) that is positioned around the coil 108, or a single c-shaped structure positioned around the coil 108. The spacer 106 also need not be attached directly, as in FIG. 1, to either the first magnet 104 or the second magnet 110. The spacer 106 may be coupled to the magnets (104 and 110) in any way—including non-direct connections. And other components of the button 100 may be positioned between (or overlapping) the spacer 106 and the first magnet 104—as well as between (or overlapping) the spacer 106 and the second magnet 110. Moreover, the spacer 106 may be coupled to the first magnet 104 in one way and coupled to the second magnet 110 in a different way. For example, the spacer 106 may be affixed to the sides of the magnets (104 and 110), the spacer 106 may be partially embedded in the magnets (104 and 110), or the spacer 106 may be connected to one or more structures connected to the magnets (104 and 110).

The cap 102 is positioned over the first magnet 104. In this embodiment, the cap 102 has a cylindrical shape and the bottom face of the cap 102 is attached to the top face of the first magnet 104, which (in this embodiment) also has a cylindrical shape. Like the spacer 106, the cap 102 may have any shape. For example, the cap 102 may be a cylinder (as in FIG. 1), cuboid, hexagonal prism, triangular prism, or pentagonal prism. And just like, the spacer 106, the cap 102 need not be a solid shape. The cap 102 may be, for example, hollow—such as a hollow cylinder, hollow cuboid, hollow hexagonal prism, hollow triangular prism, or hollow pentagonal prism. The cap 102 also need not be attached directly, as in FIG. 1, to the first magnet 104. The cap 102 may be coupled to the first magnet 104 in any way—including non-direct connections. And other components of the button 100 may be positioned between (or overlapping) the cap 102 and the first magnet 104. For example, the cap 102 may be affixed to the sides of the first magnet 104, the first magnet 104 may be partially embedded in the cap 102, or the cap 102 may be connected to one or more structures connected to the first magnet 104. The cap 102 may also be, for example, flat, such as those generally present on keyboard keys, or non-flat, such as those generally present on joysticks. Moreover, while the cap 102 is generally made of plastic, rubber, or a combination of both, the cap 102 may be made of any material. The cap 102 may be made of, for example, one or more metals. Furthermore, the surface properties of the cap 102 may be made to increase friction and improve grip. For example, the grip may be improved by indenting the surface of the cap 102.

In some configurations, the button 100 can include—but need not include—a haptic component 112 coupled to the cap 102 and coupled to the first magnet 104. The haptic component 112 may be any object, assembly, or device that generates, produces, or controls the tactility of the button 100. The haptic component 112 may be, for example, a rubber dome, tactile switch, or metal dome. Additionally, or alternative, the haptic component 112 may include devices that give feedback to the user, such as (for example) by applying forces, vibrations, or motions. As shown in FIG. 2, the haptic component 112 may be—but need not be— enclosed by the cap 102. Alternatively, the haptic component 112 may be only partially enclosed by the cap 102—or the cap 102 may not enclose the haptic component 112. Like, the cap 102, the haptic component 112 may have any shape. For example, the haptic component 112 may be a cylinder, cuboid, hexagonal prism, triangular prism, or pentagonal prism. And just like the cap 102, the haptic component 112 need not be a solid shape. The haptic component 112 may be, for example, hollow—such as a hollow cylinder, hollow cuboid, hollow hexagonal prism, hollow triangular prism, or hollow pentagonal prism. In some configurations, the haptic component 112 has a dome shape. The haptic component 112 also need not be attached directly to the cap 102 or to the first magnet 104. The haptic component 112 may be coupled to the cap 102 or to the first magnet 104 in any way—including non-direct connections. And other components of the button 100 may be positioned between (or overlapping) the haptic component 112 and the cap 102—as well as between (or overlapping) the haptic component 112 and the first magnet 104. Moreover, the haptic component 112 may be coupled to the cap 102 in one way and coupled to the first magnet 104 in a different way. For example, the haptic component 112 may be affixed to the sides of the first magnet 104 (or sides of the cap 102), the first magnet 104 may be partially embedded in the haptic component 112, or the haptic component 112 may be connected to one or more structures connected to the first magnet 104 (or connected to the cap 102).

In some configurations, the button 100 can include—but need not include—a controller 120 coupled to the coil 108. The controller 120 may be any object, assembly, or device that can be configured to apply a current to the coil 108. The controller 120 is configured to apply a first current to the coil 108 and to apply a different, second current to the coil 108. Moreover, the controller 120 is configured to extend the cap 102 by applying the first current to the coil 108 to generate a magnetic field that repels the first magnet 104 and attracts the second magnet 110 and to retract the cap 102 by applying the second current to the coil 108 to generate a magnetic field that attracts the first magnet 104 and repels the second magnet 110. In some configurations, the controller 120 may apply the first current to the coil 108 as, for example, a current pulse. Additionally, or alternatively, the controller 120 may apply the second current to the coil 108 as, for example, a current pulse.

Figure 3:
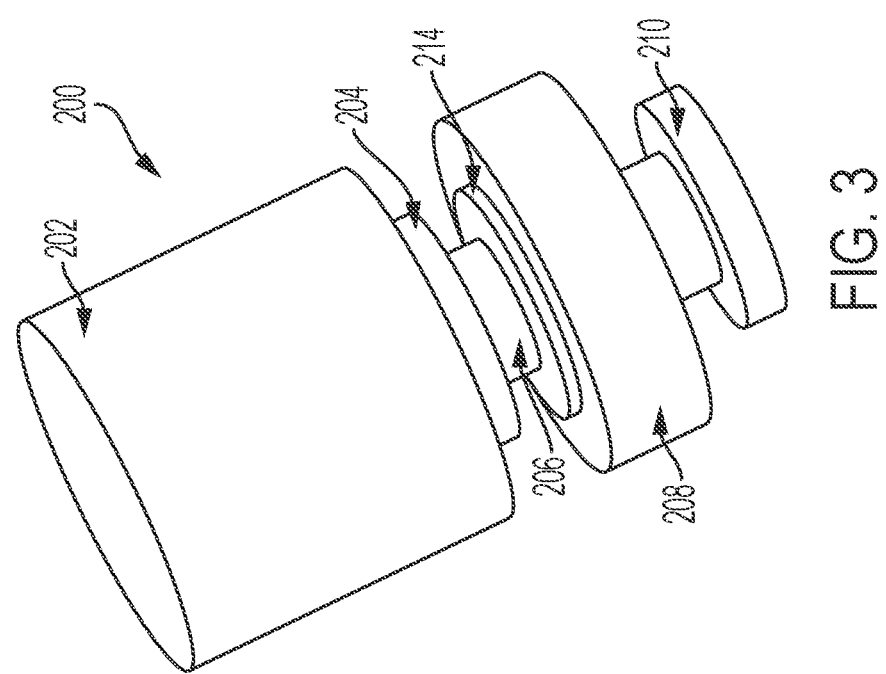
FIG. 3 is a perspective view of another example of a button according to one or more aspects of the present disclosure.
Figure 4:
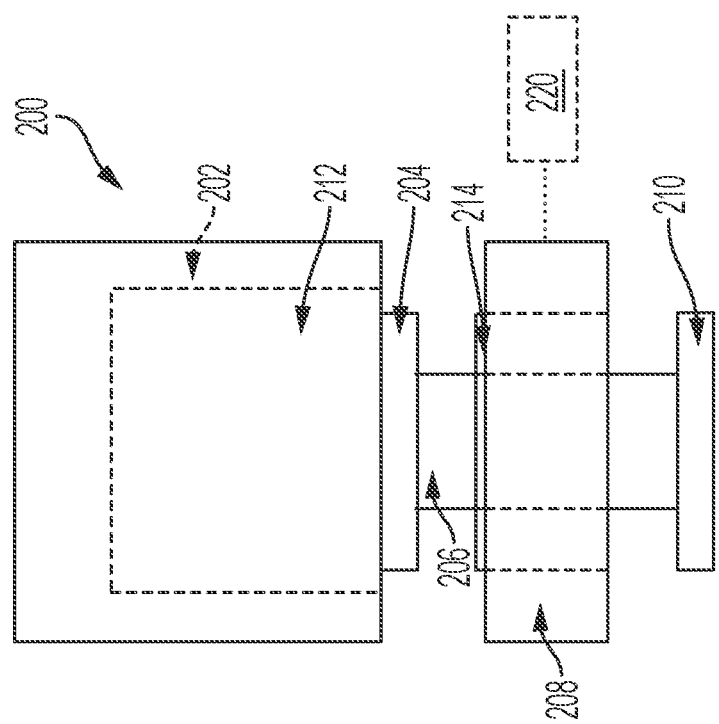
FIG. 4 is a side-view diagram of an example of the button of FIG. 3.

Referring now to FIG. 3, shown is another example of a button 200 according to one or more aspects of the present disclosure. As shown in FIG. 4, the button 200 includes a first magnet 204, a second magnet 210, a coil 208 positioned between the first magnet 204 and the second magnet 210, a spacer 206 coupled at one end to the first magnet 204, coupled at an opposite end to the second magnet 210, and configured to arrange the first magnet 204 on one side of the coil 208 and the second magnet 210 on an opposite side of the coil 208, a cap 202 coupled to the spacer 206 over the first magnet 204, and a magnetic core 214 positioned between the first magnet 204 and the second magnet 210 and that has a portion of the coil 208 positioned around it (the magnetic core 214). In some configurations, the button 200 can include—but need not include—a haptic component 212 coupled to the cap 202 and coupled to the first magnet 204. In some configurations, the button 200 can include—but need not include—a controller 220 coupled to the coil 208.

The first magnet 204 and the second magnet 210 may be any material that retains its magnetization in the absence of a re-polarizing magnetic field. These magnets (204 and 210) may be made of ferromagnetic or ferrimagnetic materials, such as iron (Fe), aluminum (Al), nickel (Ni), cobalt (Co), copper (Cu), titanium (Ti), alnico, rare-earth metals, lodestone, and ferrite. Moreover, these magnets (204 and 210) need not be made of the same material. In other words, the first magnet 204 may be made of one material and the second magnet 210 may be made of a different material. In some embodiments, the magnets 204 and 210 may be electromagnets. The first magnet 204 and the second magnet 210 may have any shape; and the first magnet 204 and the second magnet 210 need not have the same shape. For example, in FIG. 3 for example, both the first magnet 204 and the second magnet 210 have solid cylindrical shapes. These magnets (204 and 210) may have any shape, including—but not limited to—a cuboid, hexagonal prism, triangular prism, or pentagonal prism. Further, these magnets (204 and 210) need not be solid shapes. The magnets (204 and 210) may be, for example, hollow, such as a hollow cylinder, hollow cuboid, hollow hexagonal prism, hollow triangular prism, or hollow pentagonal prism.

The spacer 206 is coupled at one end to the first magnet 204, coupled at an opposite end to the second magnet 210, and configured to arrange the first magnet 204 on one side of the coil 208 and the second magnet 210 on an opposite side of the coil 208. In this embodiment, the spacer 206, the first magnet 204, and the second magnet 210 have a cylindrical shape. The bottom face of the first magnet 204 may be attached to the top face of the spacer 206 and the top face of the second magnet 210 is attached to the bottom face of the spacer 206. The spacer 206 is configured to move relative to the coil 208 to extend or retract the cap 202. Specifically, the spacer 206 is configured so that when the spacer 206 moves in a first direction, the first magnet 204 moves away from the coil 208 and the second magnet 210 moves towards the coil 208. In this configuration, the button 200 is being extended—as is the cap 202. The spacer 206 is configured so that when the spacer 206 moves in a second, opposite direction, the first magnet 204 moves towards the coil 208 and the second magnet 210 moves away from the coil 208. In this configuration, the button 200 is being retracted—as is the cap 202. In this embodiment, the spacer 206 is configured to move through the coil 208. The spacer 206 may, for example, slide (in a plunger-like motion) through the coil, but the spacer 206 need not move through the coil 208. The spacer 206 may, for example, be positioned around the coil 208, while still being configured to move relative to the coil 208. Like the magnets (204 and 210), the spacer 206 may have any shape—and need not have the same shape as either one of the first magnet 204 or the second magnet 210. For example, the spacer 206 may be a cylinder (as in FIG. 3), cuboid, hexagonal prism, triangular prism, or pentagonal prism. And just like the magnets (204 and 210), the spacer 206 need not be a solid shape. The spacer 206 may be, for example, hollow—such as a hollow cylinder, hollow cuboid, hollow hexagonal prism, hollow triangular prism, or hollow pentagonal prism. Furthermore, the spacer 206 need not be one single piece. The spacer 206 may, for example, consist of multiple pieces coupled to each other in series, consist of multiple pieces individually coupled to the magnets (204 and 210), or consist of multiple pieces coupled to each other to create a single structure that is coupled to the magnets (204 and 210). For example, the spacer 206 may be multiple hollow cylinders in series positioned through the coil 208, multiple hollow cylinders parallel to each other and positioned through the coil 208, a hollow cuboid (made of one or more pieces) that is positioned around the coil 208, or a single c-shaped structure positioned around the coil 208. The spacer 206 also need not be attached directly, as in FIG. 3, to either the first magnet 204 or the second magnet 210. The spacer 206 may be coupled to the magnets (204 and 210) in any way, including non-direct connections. And other components of the button 200 may be positioned between (or overlapping) the spacer 206 and the first magnet 204—as well as between (or overlapping) the spacer 206 and the second magnet 210. Moreover, the spacer 206 may be coupled to the first magnet 204 in one way and coupled to the second magnet 210 in a different way. For example, the spacer 206 may be affixed to the sides of the magnets (204 and 210), the spacer 206 may be partially embedded in the magnets (204 and 210), or the spacer 206 may be connected to one or more structures connected to the magnets (204 and 210).

The cap 202 is positioned over the first magnet 204. In this embodiment, the cap 202 has a cylindrical shape and the bottom face of the cap 202 is attached to the top face of the first magnet 204, which (in this embodiment) also has a cylindrical shape. Like the spacer 206, the cap 202 may have any shape. For example, the cap 202 may be a cylinder (as in FIG. 3), cuboid, hexagonal prism, triangular prism, or pentagonal prism. And just like, the spacer 206, the cap 202 need not be a solid shape. The cap 202 may be, for example, hollow—such as a hollow cylinder, hollow cuboid, hollow hexagonal prism, hollow triangular prism, or hollow pentagonal prism. The cap 202 also need not be attached directly, as in FIG. 3, to the first magnet 204. The cap 202 may be coupled to the first magnet 204 in any way— including non-direct connections. And other components of the button 200 may be positioned between (or overlapping) the cap 202 and the first magnet 204. For example, the cap 202 may be affixed to the sides of the first magnet 204, the first magnet 204 may be partially embedded in the cap 202, or the cap 202 may be connected to one or more structures connected to the first magnet 204. The cap 202 may also be, for example, flat, such as those generally present on keyboard keys, or non-flat, such as those generally present on joysticks. Moreover, while the cap 202 is generally made of plastic, rubber, or a combination of both, the cap 202 may be made of any material. The cap 202 may be made of, for example, one or more metals. Furthermore, the surface properties of the cap 202 may be made to increase friction and improve grip. For example, the grip may be improved by indenting the surface of the cap 202.

The magnetic core 214 may be made of ferromagnetic or ferrimagnetic materials, such as—for example—iron (Fe), aluminum (Al), nickel (Ni), cobalt (Co), copper (Cu), titanium (Ti), alnico, rare-earth metals, lodestone, and ferrite. The magnetic core 214 may be made of iron or other magnetic materials with low remanence, but, in some embodiments, the magnetic core 214 may be a material that retains residual magnetization (e.g., materials with a higher remanence). And the magnetic core 214 may be laminated. In some configurations, the magnetic core 214 may, for example, be made of soft metals and include soft iron or laminated silicon steel. The magnetic core 214 may have any shape. In FIG. 3 for example, the magnetic core 214 has a hollow cylindrical shape. But the magnetic core 214 may have any shape, including—but not limited to—a hollow cuboid, hollow hexagonal prism, hollow triangular prism, or hollow pentagonal prism. And the magnetic core 214 need not be a hollow shape. The magnetic core 214 may be, for example, solid—such as a cylinder, cuboid, hexagonal prism, triangular prism, or pentagonal prism. In some configurations, the magnetic core 214 may be, for example, a cylindrical core, an I core, a C core, a U core, an E core, a pot core, a toroidal core, a ring core, or a planar core. The magnetic core 214 is positioned between the first magnet 204 and the second magnet 210 and has a portion of the coil 208 positioned around it (the magnetic core 214). In FIG. 3 for example, a portion of the coil 208 is wrapped around the magnetic core 214. The magnetic core 214 is configured to latch to the second magnet 210 when the button 200 is extended. And the magnetic core 214 is configured latch to the first magnet 204 when the button 200 is retracted. In some configurations, the magnetic core 214 and the second magnet 210 stay fixed relative to each other when forces of less than 150 Newton (such as those exerted by a user pressing or moving the button 200) are applied to the cap 202. In some configurations, the magnetic core 214 and the first magnet 204 stay fixed relative to each other when forces of less than 150 Newton (such as those exerted by a user pulling or moving the button 200) are applied to the cap 202. By latching to the magnets and maintaining the button in a retracted or an extended position without using power, magnetic cores may reduce the button's energy consumption without hindering the button's functionality.

In some configurations, the button 200 can include—but need not include—a haptic component 212 coupled to the cap 202 and coupled to the first magnet 204. The haptic component 212 may be any object, assembly, or device that generates, produces, or controls the tactility of the button 200. The haptic component 212 may be, for example, a rubber dome, tactile switch, or metal dome. Additionally, or alternative, the haptic component 212 may include devices that give feedback to the user, such as (for example) by applying forces, vibrations, or motions. As shown in FIG. 4, the haptic component 212 may be—but need not be— enclosed by the cap 202. Alternatively, the haptic component 212 may be only partially enclosed by the cap 202—or the cap 202 may not enclose the haptic component 212. Like, the cap 202, the haptic component 212 may have any shape. For example, the haptic component 212 may be a cylinder, cuboid, hexagonal prism, triangular prism, or pentagonal prism. And just like the cap 202, the haptic component 212 need not be a solid shape. The haptic component 212 may be, for example, hollow—such as a hollow cylinder, hollow cuboid, hollow hexagonal prism, hollow triangular prism, or hollow pentagonal prism. In some configurations, the haptic component 212 has a dome shape. The haptic component 212 also need not be attached directly to the cap 202 or to the first magnet 204. The haptic component 212 may be coupled to the cap 202 or to the first magnet 204 in any way—including non-direct connections. And other components of the button 200 may be positioned between (or overlapping) the haptic component 212 and the cap 202—as well as between (or overlapping) the haptic component 212 and the first magnet 204. Moreover, the haptic component 212 may be coupled to the cap 202 in one way and coupled to the first magnet 204 in a different way. For example, the haptic component 212 may be affixed to the sides of the first magnet 204 (or sides of the cap 202), the first magnet 204 may be partially embedded in the haptic component 212, or the haptic component 212 may be connected to one or more structures connected to the first magnet 204 (or connected to the cap 202).

In some configurations, the button 200 can include—but need not include—a controller 220 coupled to the coil 208. The controller 220 may be any object, assembly, or device that can be configured to apply a current to the coil 208. The controller 220 is configured to apply a first current to the coil 108 and to apply a different, second current to the coil 208. Moreover, the controller 220 is configured to extend the cap 202 by applying the first current to the coil 208 to generate a magnetic field that repels the first magnet 204 and attracts the second magnet 210 and to retract the cap 202 by applying the second current to the coil 208 to generate a magnetic field that attracts the first magnet 204 and repels the second magnet 210. In some configurations, the controller 220 may apply the first current to the coil 208 as, for example, a current pulse. Additionally, or alternatively, the controller 220 may apply the second current to the coil 208 as, for example, a current pulse. In some configurations, the controller 220 is configured to apply the first current with an amplitude and a duration to maintain the magnetic core 214 and the second magnet 210 fixed relative to each other when the first current is removed from the coil 208. In such configurations, the cap 202 would stay extended after the first current is removed from the coil 208. Additionally, or alternatively, in some configurations, the controller 220 is configured to apply the second current with an amplitude and a duration to maintain the magnetic core 214 and the first magnet 204 fixed relative to each other when the second current is removed from the coil 208. In such configurations, the cap 202 would stay retracted after the second current is removed from the coil 208. In some configurations, the controller 220 is configured to apply the first current with an amplitude and a duration to maintain the magnetic core 214 and the second magnet 210 fixed relative to each other when the first current is removed from the coil 208 and forces of less than 150 Newton are applied to the cap 202. In such configurations, the cap 202 would stay extended after the first current is removed from the coil 208 and the cap 202 would stay extended when a user applied forces of less than 150 Newton to the cap 202, such as (for example) by pressing or moving the button 200. Additionally, or alternatively, in some configurations, the controller 220 is configured to apply the second current with an amplitude and a duration to maintain the magnetic core 214 and the first magnet 204 fixed relative to each other when the second current is removed from the coil 208 and forces of less than 150 Newton are applied to the cap 202. In such configurations, the cap 202 would stay retracted after the second current is removed from the coil 208 and the cap 202 would stay retracted when a user applied forces of less than 150 Newton to the cap 202, such as (for example) by pulling or moving the button 200.

Figure 5:
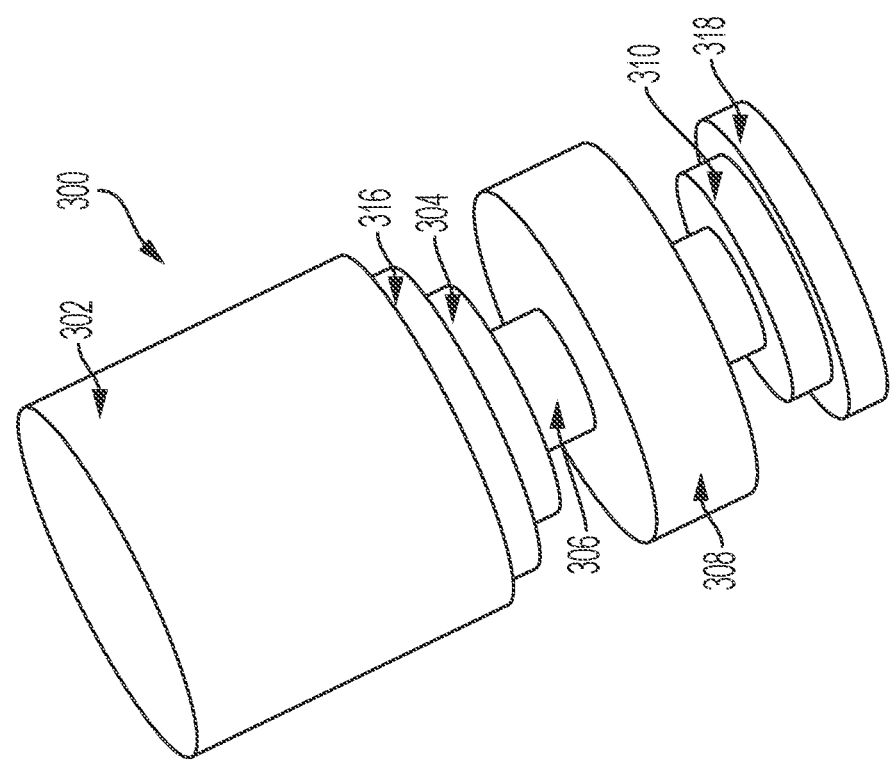
FIG. 5 is a perspective view of another example of a button according to one or more aspects of the present disclosure.
Figure 6:
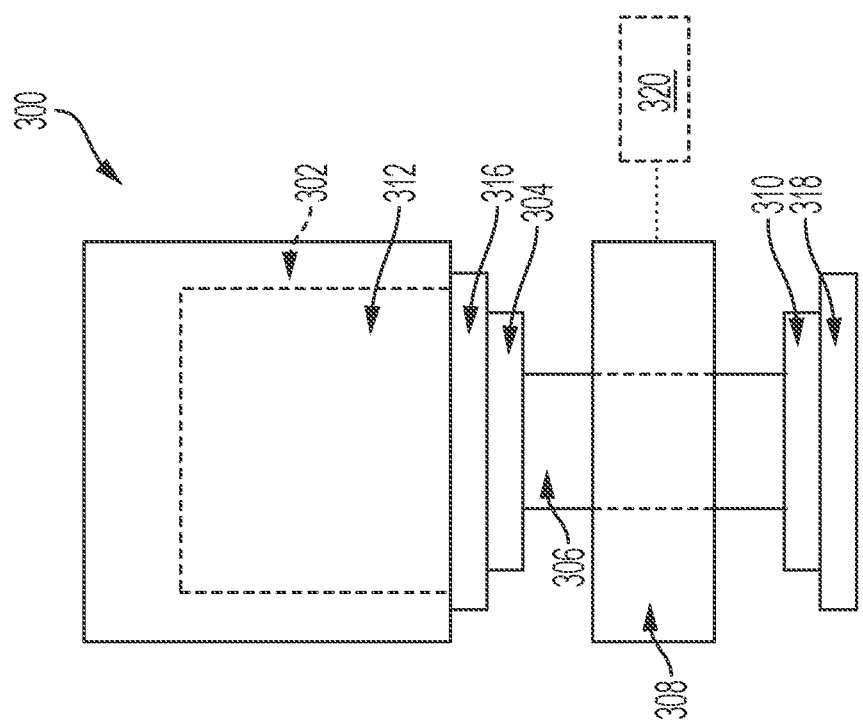
FIG. 6 is a side-view diagram of an example of the button of FIG. 5.

Referring now to FIG. 5, shown is another example of a button according to one or more aspects of the present disclosure. As shown in FIG. 6, the button 300 includes a first magnet 304, a second magnet 310, a coil 308 positioned between the first magnet 304 and the second magnet 310, a spacer 306 coupled at one end to the first magnet 304, coupled at an opposite end to the second magnet 310, and configured to arrange the first magnet 304 on one side of the coil 308 and the second magnet 310 on an opposite side of the coil 308, a cap 302 coupled to the spacer 306 over the first magnet 304, a first backing plate 316 coupled to the first magnet 304, and a second backing plate 318 coupled to the second magnet 310. In some configurations, the button 300 can include—but need not include—a haptic component 312 coupled to the cap 302 and coupled to the first magnet 304. In some configurations, the button 300 can include—but need not include—a controller 320 coupled to the coil 308.

The first magnet 304 and the second magnet 310 may be any material that retains its magnetization in the absence of a re-polarizing magnetic field. These magnets (304 and 310) may be made of ferromagnetic or ferrimagnetic materials, such as—for example—iron (Fe), aluminum (Al), nickel (Ni), cobalt (Co), copper (Cu), titanium (Ti), alnico, rare-earth metals, lodestone, and ferrite. Moreover, these magnets (304 and 310) need not be made of the same material. In other words, the first magnet 304 may be made of one material and the second magnet 310 may be made of a different material. In some embodiments, the magnets 304 and 310 may be electromagnets. The first magnet 304 and the second magnet 310 may have any shape—and the first magnet 304 and the second magnet 310 need not have the same shape. For example, in FIG. 5, both the first magnet 304 and the second magnet 310 have solid cylindrical shapes. These magnets (304 and 310) may have any shape, including—but not limited to—a cuboid, hexagonal prism, triangular prism, or pentagonal prism. Further, these magnets (304 and 310) need not be solid shapes. The magnets (304 and 310) may be, for example, hollow—such as a hollow cylinder, hollow cuboid, hollow hexagonal prism, hollow triangular prism, or hollow pentagonal prism.

The spacer 306 is coupled at one end to the first magnet 304, coupled at an opposite end to the second magnet 310, and configured to arrange the first magnet 304 on one side of the coil 308 and the second magnet 310 on an opposite side of the coil 308. In this embodiment, the spacer 306, the first magnet 304, and the second magnet 310 have a cylindrical shape. The bottom face of the first magnet 304 may be attached to the top face of the spacer 306 and the top face of the second magnet 310 is attached to the bottom face of the spacer 306. The spacer 306 is configured to move relative to the coil 308: to extend or retract the cap 302. Specifically, the spacer 306 is configured so that when the spacer 306 moves in a first direction, the first magnet 304 moves away from the coil 308 and the second magnet 310 moves towards the coil 308. In this configuration, the button 300 is being extended—as is the cap 302. The spacer 306 is configured so that when the spacer 306 moves in a second, opposite direction, the first magnet 304 moves towards the coil 308 and the second magnet 310 moves away from the coil 308. In this configuration, the button 300 is being retracted—as is the cap 302. In this embodiment, the spacer 306 is configured to move through the coil 308. The spacer 306 may, for example, slide (in a plunger-like motion) through the coil, but the spacer 306 need not move through the coil 308. The spacer 306 may, for example, be positioned around the coil 308—while still being configured to move relative to the coil 308. Like the magnets (304 and 310), the spacer 306 may have any shape—and need not have the same shape as either one of the first magnet 304 or the second magnet 310. For example, the spacer 306 may be a cylinder (as in FIG. 5), cuboid, hexagonal prism, triangular prism, or pentagonal prism. And just like the magnets (304 and 310), the spacer 306 need not be a solid shape. The spacer 306 may be, for example, hollow—such as a hollow cylinder, hollow cuboid, hollow hexagonal prism, hollow triangular prism, or hollow pentagonal prism. Furthermore, the spacer 306 need not be one single piece. The spacer 306 may, for example, consist of multiple pieces coupled to each other in series, consist of multiple pieces individually coupled to the magnets (304 and 310), or consist of multiple pieces coupled to each other to create a single structure that is coupled to the magnets (304 and 310). For example, the spacer 306 may be multiple hollow cylinders in series positioned through the coil 308, multiple hollow cylinders parallel to each other and positioned through the coil 308, a hollow cuboid (made of one or more pieces) that is positioned around the coil 308, or a single c-shaped structure positioned around the coil 308. The spacer 306 also need not be attached directly, as in FIG. 5, to either the first magnet 304 or the second magnet 310. The spacer 306 may be coupled to the magnets (304 and 310) in any way—including non-direct connections. And other components of the button 300 may be positioned between (or overlapping) the spacer 306 and the first magnet 304—as well as between (or overlapping) the spacer 306 and the second magnet 310. Moreover, the spacer 306 may be coupled to the first magnet 304 in one way and coupled to the second magnet 310 in a different way. For example, the spacer 306 may be affixed to the sides of the magnets (304 and 310), the spacer 306 may be partially embedded in the magnets (304 and 310), or the spacer 306 may be connected to one or more structures connected to the magnets (304 and 310).

The cap 302 is positioned over the first magnet 304. In this embodiment, the cap 302 has a cylindrical shape and the bottom face of the cap 302 is attached to the top face of the first magnet 304, which (in this embodiment) also has a cylindrical shape. Like the spacer 306, the cap 302 may have any shape. For example, the cap 302 may be a cylinder (as in FIG. 5), cuboid, hexagonal prism, triangular prism, or pentagonal prism. And just like, the spacer 306, the cap 302 need not be a solid shape. The cap 302 may be, for example, hollow—such as a hollow cylinder, hollow cuboid, hollow hexagonal prism, hollow triangular prism, or hollow pentagonal prism. The cap 302 also need not be attached directly, as in FIG. 5, to the first magnet 304. The cap 302 may be coupled to the first magnet 304 in any way—including non-direct connections. And other components of the button 300 may be positioned between (or overlapping) the cap 302 and the first magnet 304. For example, the cap 302 may be affixed to the sides of the first magnet 304, the first magnet 304 may be partially embedded in the cap 302, or the cap 302 may be connected to one or more structures connected to the first magnet 304. The cap 302 may also be, for example, flat, such as those generally present on keyboard keys, or non-flat, such as those generally present on joysticks. Moreover, while the cap 302 is generally made of plastic, rubber, or a combination of both, the cap 302 may be made of any material. The cap 302 may be made of, for example, one or more metals. Furthermore, the surface properties of the cap 302 may be made to increase friction and improve grip. For example, the grip may be improved by indenting the surface of the cap 302.

The backing plates (316 and 318) may have any shape and may be made of any material. For example the backing plates (316 and 318) may be steel plates. In some configurations, the backing plates (316 and 318) help maximize the magnetic force of the magnets (304 and 310) by guiding the magnetic fields of the magnets (304 and 310). In some configurations, the backing plates (316 and 318) may help keep the magnetic fields of the magnets (304 and 310) from projecting out into neighboring areas where sensitive components may be located. For example, in an array of buttons 300, the backing plates (316 and 318) may help keep the magnetic fields of the magnets (304 and 310) from projecting out into neighboring buttons 300. In some configurations, the backing plates (316 and 318) may allow designers and manufacturers to develop buttons, arrays of buttons, and user-input devices with—or in—compact structures.

In some configurations, the button 300 can include—but need not include—a haptic component 312 coupled to the cap 302 and coupled to the first magnet 304. The haptic component 312 may be any object, assembly, or device that generates, produces, or controls the tactility of the button 300. The haptic component 312 may be, for example, a rubber dome, tactile switch, or metal dome. Additionally, or alternative, the haptic component 312 may include devices that give feedback to the user, such as (for example) by applying forces, vibrations, or motions. As shown in FIG. 6, the haptic component 312 may be—but need not be—enclosed by the cap 302. Alternatively, the haptic component 312 may be only partially enclosed by the cap 302—or the cap 302 may not enclose the haptic component 312. Like, the cap 302, the haptic component 312 may have any shape. For example, the haptic component 312 may be a cylinder, cuboid, hexagonal prism, triangular prism, or pentagonal prism. And just like the cap 302, the haptic component 312 need not be a solid shape. The haptic component 312 may be, for example, hollow—such as a hollow cylinder, hollow cuboid, hollow hexagonal prism, hollow triangular prism, or hollow pentagonal prism. In some configurations, the haptic component 312 has a dome shape. The haptic component 312 also need not be attached directly to the cap 302 or to the first magnet 304. The haptic component 312 may be coupled to the cap 302 or to the first magnet 304 in any way—including non-direct connections. And other components of the button 300 may be positioned between (or overlapping) the haptic component 312 and the cap 302—as well as between (or overlapping) the haptic component 312 and the first magnet 304. Moreover, the haptic component 312 may be coupled to the cap 302 in one way and coupled to the first magnet 304 in a different way. For example, the haptic component 312 may be affixed to the sides of the first magnet 304 (or sides of the cap 302), the first magnet 304 may be partially embedded in the haptic component 312, or the haptic component 312 may be connected to one or more structures connected to the first magnet 304 (or connected to the cap 302).

In some configurations, the button 300 can include—but need not include—a controller 320 coupled to the coil 308. The controller 320 may be any object, assembly, or device that can be configured to apply a current to the coil 308. The controller 320 is configured to apply a first current to the coil 308 and to apply a different, second current to the coil 308. Moreover, the controller 320 is configured to extend the cap 302 by applying the first current to the coil 308 to generate a magnetic field that repels the first magnet 304 and attracts the second magnet 310 and to retract the cap 302 by applying the second current to the coil 308 to generate a magnetic field that attracts the first magnet 304 and repels the second magnet 310. In some configurations, the controller 320 may apply the first current to the coil 308 as, for example, a current pulse. Additionally, or alternatively, the controller 320 may apply the second current to the coil 308 as, for example, a current pulse.

Figure 7:
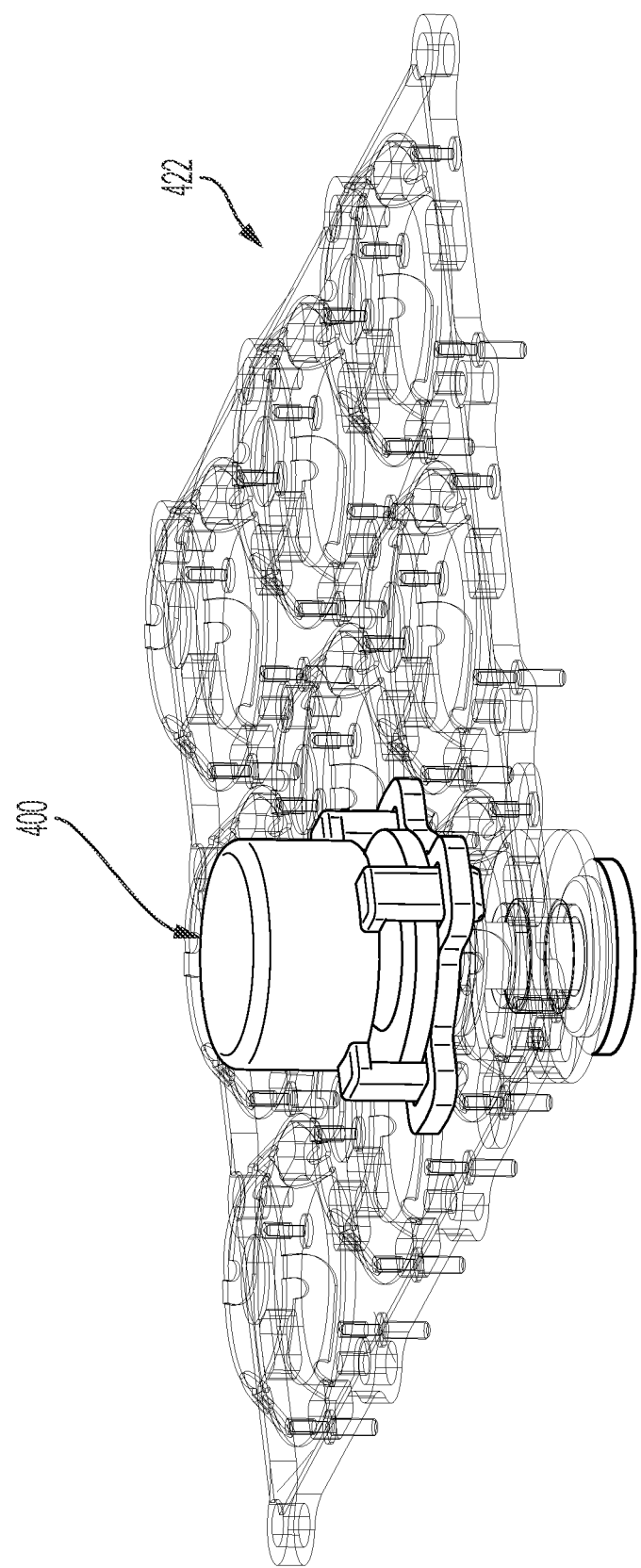
FIG. 7 is a perspective view of an example of a button in a first configuration of an array of buttons according to one or more aspects of the present disclosure.

Referring now to FIG. 7, shown is an example of a button in a first configuration of an array of buttons 422 according to one or more aspects of the present disclosure. As shown in FIG. 7, the array of buttons 422 includes at least one of a button 400. The button 400 may be any of the button 100, the button 200, or the button 300. Additionally, or alternatively, the button 400 may include or combine features, components, or elements from any of the button 100, the button 200, or the button 300. In some configurations, the array of buttons 422 can include—but need not include—a printed circuit board 426 coupling the buttons of the array of buttons 422. In some configurations, the array of buttons 422 can include—but need not include—a housing at least partially enclosing the printed circuit board 426. In some configurations, the array of buttons 422 can include—but need not include—a controller 420 coupled to the array of buttons 422.

Figure 8:
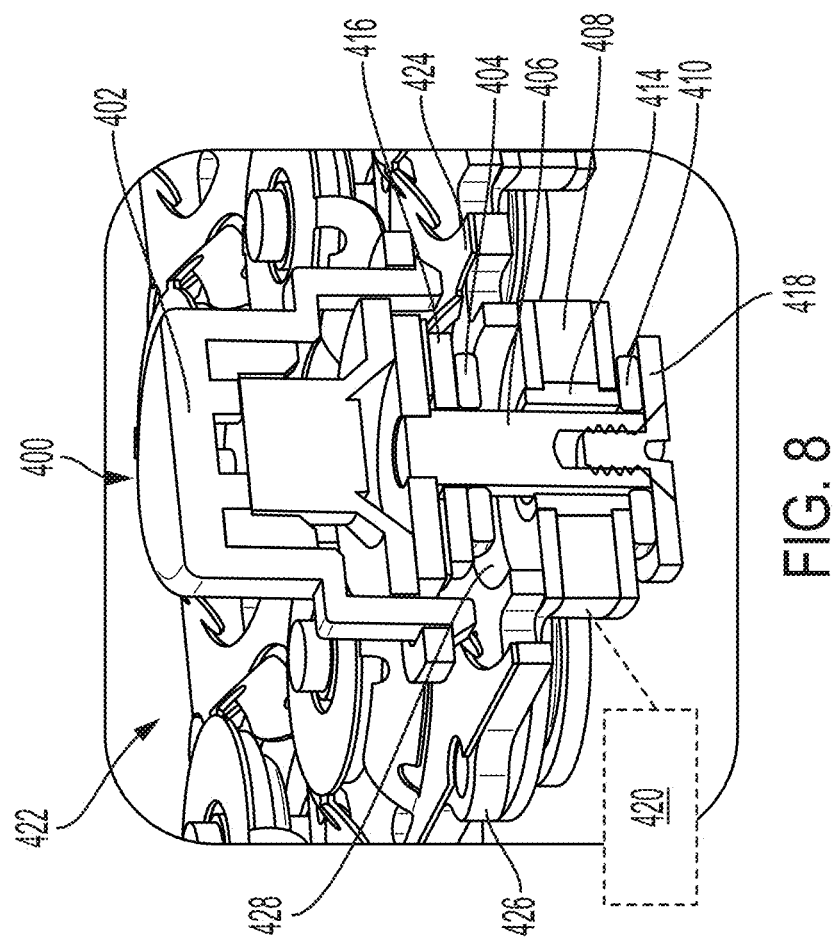
FIG. 8 is a sectional view of an example of the button of FIG. 7.

In the example shown in FIG. 8, the button 400 includes a first magnet 404, a second magnet 410, a coil 408 positioned between the first magnet 404 and the second magnet 410, a spacer 406 coupled at one end to the first magnet 404, coupled at an opposite end to the second magnet 410, and configured to arrange the first magnet 404 on one side of the coil 408 and the second magnet 410 on an opposite side of the coil 408, a cap 402 coupled to the spacer 406 over the first magnet 404, a magnetic core 414 positioned between the first magnet 404 and the second magnet 410 and that has a portion of the coil 408 positioned around it (the magnetic core 414), a first backing plate 416 coupled to the first magnet 404, and a second backing plate 418 coupled to the second magnet 410.

Figure 9:
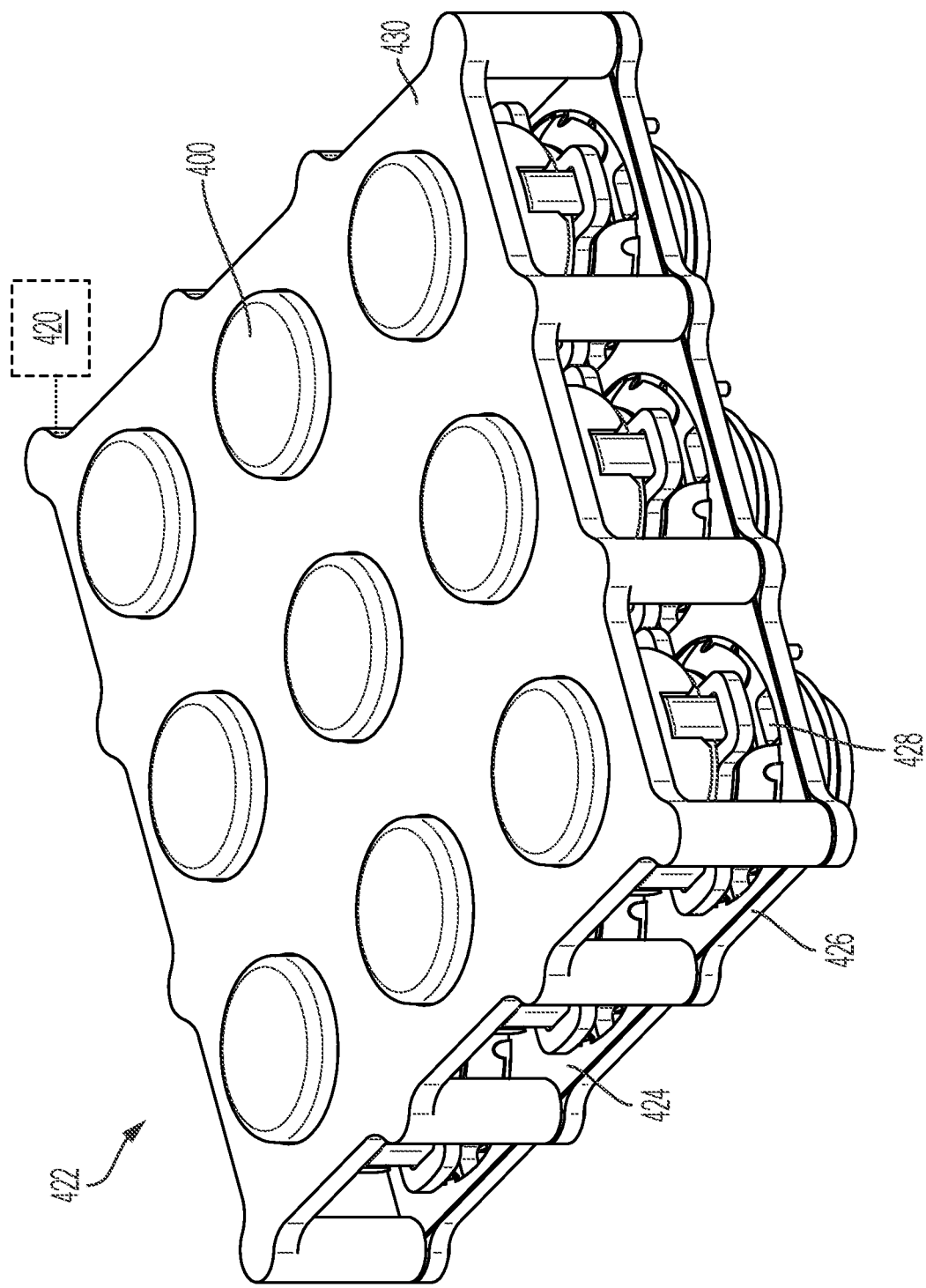
FIG. 9 is a perspective view of an example of the button of FIG. 8 in a second configuration of an array of buttons according to one or more aspects of the present disclosure.

In some configurations, the array of buttons 422 can include—but need not include—a printed circuit board 426 coupling the buttons of the array of buttons 422. As shown in FIG. 8 and FIG. 9, the printed circuit board 426 may be coupled to a supporting structure 426, or other structure. Although not shown, additional electronic components (e.g., power source, processors, memory storage, transistors, resistors, graphics cards, integrated circuits, or other circuitry or hardware) may be coupled to the printed circuit board 426 and can be electrically connected to the button 400 via the printed circuit board 426. In some configurations, the PCB 426 may define one or more of an aperture 428 (e.g., slot, opening). In some configurations, the aperture 428 may be sized to receive at least a portion of the button 400. For example, the aperture 428 may be sized to receive the first magnet 404, sized to receive the first backing plate 416, sized to receive the cap 402 (or a portion of the cap 402), or sized to receive any of the other components of the button 400. In some configurations, at least one of the components of the button 400 is fixed to the structure 424 or fixed to the PCB 426. For example, the coil 408 or the magnetic core 414 may be fixed to the structure 424 or fixed to the PCB 426. In some configurations, the structure 424 may define one or more openings configured to be aligned with the apertures 428 such that while the button 400 is coupled to the structure 424 at least a portion of the button 400 extends through both the PCB 426 and the structure 424. Additionally, or alternatively, the structure 424 may define one or more openings configured to accommodate other components of the button 400 or accommodate components connected to the button 400 so that the button 400 or the array of buttons 422 may operate as described. Additionally, or alternatively, the PCB 426 may define one or more openings configured to accommodate other components of the button 400 or accommodate components connected to the button 400 so that the button 400 or the array of buttons 422 may operate as described. As shown in FIGS. 7-9, the button 400 is configured to extend or retract relative to the printed circuit board 424 (or relative to the PCB 426). For example, when the first magnet 404 moves away from the coil 408 and the second magnet 410 moves towards the coil 408, the button 400 is extended relative to the structure 424. And, as another example, when the first magnet 404 moves towards the coil 408 and the second magnet 410 moves away from the coil 408, the button 400 is retracted relative to the printed circuit board 424.

In some configurations, the array of buttons 422 can include—but need not include—a housing at least partially enclosing the structure 424. The housing can define a chamber configured to accommodate at least a portion of each of the buttons of the array of buttons 422—including a portion of the button 400. For example, a first end of the button 400 may be disposed within the housing and a second end of the button 400 may be disposed outside the housing (e.g., via an opening) to be manipulated by a user. And, as another example, the button 400 may be completely disposed within the housing 426—in other words, all components of the button 400 may be within the housing. As shown in FIG. 9, the button 400 is configured to extend or retract relative to the housing 426. For example, when the first magnet 404 moves away from the coil 408 and the second magnet 410 moves towards the coil 408, the button 400 is extended relative to the housing 426. And, as another example, when the first magnet 404 moves towards the coil 408 and the second magnet 410 moves away from the coil 408, the button 400 is retracted relative to the housing 426. In some configurations, when the button 400 is retracted relative to the housing 426, the user may not manipulate the button 400. For example, the button 400 may be retracted so that it is completely disposed within the housing (and beyond the reach of a user). But the button 400 need not be completely retracted relative to the housing 426. In other words, the button 400 may be only partially retracted relative to the housing 426. Similarly, the button 400 may be completely extended relative to the housing or the button 400 may be only partially extended relative to the housing. In FIG. 9, for example, the button 400 is extended so that a user may manipulate a portion of the cap 402.

In some configurations, the array of buttons 422 can include—but need not include—a controller 420 coupled to the array of buttons 422. The controller 420 may be any object, assembly, or device that can be configured to apply a current to the coil 408. The controller 420 may be configured to independently extend—or independently retract—as many of the button 400 as are present in the array of buttons 422. The controller 420 may be any of the controller 120, the controller 220, or the controller 320. Additionally, or alternatively, the controller 400 may be configured to include or combine features, components, or elements from any of the controller 120, the controller 220, or the controller 320 to independently extend—or independently retract—as many of the button 400 as are present in the array of buttons 422. Furthermore, the controller 420 may be configured to extend a first set of buttons consisting of one or more of the button 400 that are present in the array of buttons 422 and to retract a different, second set of buttons consisting of one or more of the button 400 that are present in the array of buttons 422.

Figure 10:
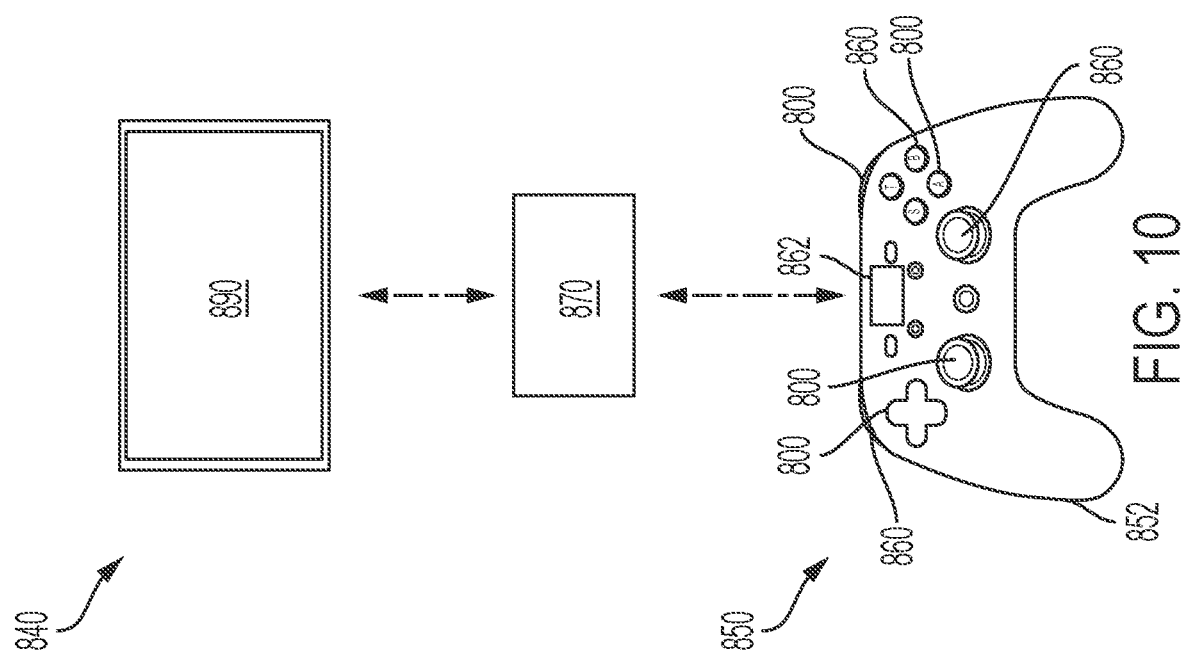
FIG. 10 is a schematic diagram of an example of a system that includes an example of a button according to one or more aspects of the present disclosure.
Figure 11:
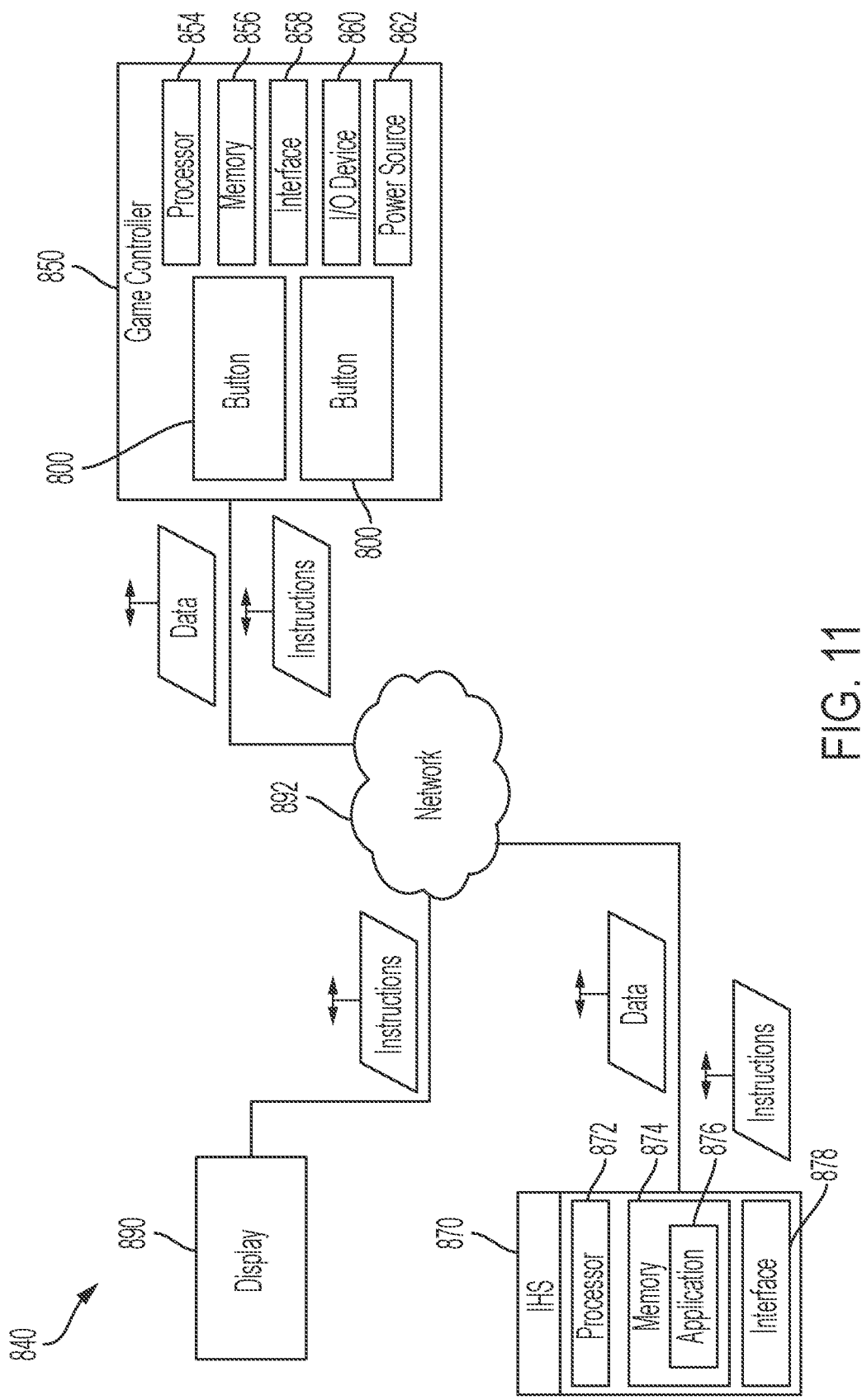
FIG. 11 is a block diagram of an example of the system of FIG. 10.

Referring now to FIGS. 10 and 11, a system 840 that includes an example of a button 800 according to one or more aspects of the present disclosure is shown. The system 840 includes one or more of a gaming controller 850, one or more of a display 890, and one or more of an information handling systems (IHS) 870 (e.g., video game console, entertainment console, personal computer, or other multimedia device) configured to execute one or more applications (e.g., video games). In some embodiments, the IHS 870 executing applications may be integrated with the display 890. In some configurations, the display 890 and the IHS 870 can be integrated with the gaming controller 850 as part of a mobile computing system or other information handling system such that the applications are executed at the gaming controller 850.

The gaming controller 850 is in communication with the IHS 870 (e.g., wired or wireless communication) and is configured to send and receive signals (e.g., user input signal, feedback signal) with the external device to navigate or otherwise control the applications. For example, as shown in FIG. 10, the gaming controller 850 is a video game controller, the IHS 870 is a gaming console, and the display 890 is a television. In some such configurations, the various devices of the system 840 (e.g., the gaming controller 850, the IHS 870, and the display 890) may be communicatively coupled to each other via one or more of a network 892 (e.g., a Bluetooth personal area network (PAN), an Ethernet local area network (LAN), a wireless local area network, a wide area network (WAN), or other network).

The gaming controller 850 can include a controller casing 852 (e.g., shell) that defines an interior cavity configured to at least partially accommodate one or more of the buttons 800, one or more of an input-output device 860, or other components of the gaming controller 850. The button 800 may include or correspond to an embodiment of the button 100, the button 200, the button 300, or the button 400. For example, the first button 800 may correspond to the button 400 and include a first magnet 404, a second magnet 410, a coil 408 positioned between the first magnet 404 and the second magnet 410, a spacer 406 coupled at one end to the first magnet 404, coupled at an opposite end to the second magnet 410, and configured to arrange the first magnet 404 on one side of the coil 408 and the second magnet 410 on an opposite side of the coil 408, a cap 402 coupled to the spacer 406 over the first magnet 404, a magnetic core 414 positioned between the first magnet 404 and the second magnet 410 and that has a portion of the coil 408 positioned around it (the magnetic core 414), a first backing plate 416 coupled to the first magnet 404, and a second backing plate 418 coupled to the second magnet 410. In some configurations, the button 800 is configured to extend or retract relative to the controller casing 852. As an example, when the button 800 corresponds to the button 400, the button 400 may be configured to extend or retract relative to the controller casing 852. In such example, when the first magnet 404 moves away from the coil 408 and the second magnet 410 moves towards the coil 408, the button 400 is extended relative to the controller casing 852. In another such example, when the first magnet 404 moves towards the coil 408 and the second magnet 410 moves away from the coil 408, the button 400 is retracted relative to the controller casing 852. In some configurations, when the button 800 is retracted relative to the controller casing 852, the user may not manipulate the button 800. For example, the button 800 may be retracted so that it is completely disposed within the controller casing 852 (and beyond the reach of a user). But the button 800 need not be completely retracted relative to the controller casing 852. In other words, the button 800 may be only partially retracted relative to the controller casing 852. Similarly, the button 800 may be completely extended relative to the controller casing 852 or the button 800 may be only partially extended relative to the controller casing 852. In FIG. 10, for example, the buttons 800 are extended so that a user may manipulate the buttons 800.

As shown in FIG. 11, the gaming controller 850 may include a processor 854, a memory 856, an interface 858, an input-output (I/O) device 860, a power source 862, or a combination of these components. The gaming controller 850 in FIGS. 10 and 11 need not include all the components shown and may include additional components.

The processor 854 may be a central processing unit (CPU) or other computing circuitry (e.g., a microcontroller, one or more application specific integrated circuits (ASICs), or the like) and may have one or more processing cores. The processor 854 is configured to independently extend—or independently retract—as many of the button 800 as are present in the gaming controller 850. The processor 854 may include or correspond to an embodiment of the controller 120, the controller 220, the controller 320, or the controller 420. Additionally, or alternatively, the processor 854 may be configured to include or combine features, components, or elements from any of the controller 120, the controller 220, the controller 320, or the controller 420 to independently extend—or independently retract—as many of the button 800 as are present in gaming controller 850. Furthermore, the processor 854 may be configured to extend a first set of buttons consisting of one or more of the buttons 800 that are present in the gaming controller 850 and to retract a different, second set of buttons consisting of one or more of the buttons 800 that are present in the gaming controller 850. Additionally, or alternatively, the processor 854 may, for example, execute a first profile that extends a first set of one or more of the buttons 800 and retracts a second set of one or more of the buttons 800. And, for example, the processor 854 may execute a second profile that extends a third set of one or more of the buttons 800 and retracts a fourth set of one or more of the buttons 800. Control over the various buttons 800 may be performed in response to instructions received from the IHS 870.

The memory 856 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 856 may store instructions that, when executed by the processor 854, cause the processor 854 to perform the operations in connection with the gaming controller 850. Additionally, the memory 856 may store one or more profiles, thresholds, data, preferences, or other settings. For example, the memory 856 may store a first profile that when executed by the processor extends a first set of one or more of the buttons 800 and retracts a second set of one or more of the buttons 800. And, for example, the memory 856 may store a second profile that when executed by the processor extends a third set of one or more of the buttons 800 and retracts a fourth set of one or more of the buttons 800.

The interface 858 may be configured to enable wireless communication between the gaming controller 850 and the IHS 870, communication between the gaming controller 850 and the display 890, or both. In some implementations, the interface 858 may include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, another type of network interface, or the like.

The I/O device 860 may include, for example, one or more buttons (e.g., depressible buttons, triggers, joysticks, pads, bumpers, or the like), one or more touchscreens, one or more microphones, one or more cameras, one or more speakers, one or more light sources, one or more vibration devices, or any other device that enables a user to receive information from the gaming controller 850 or provide information to the gaming controller 850.

The IHS 870 is configured to support and operate one or more electronic applications (e.g., 876), such as a video game, video streaming platform, music streaming platform, or other media platform. The IHS 870 is referred to broadly and includes any suitable processor-based device such as, for example, a video game console, a hand-held console, a desktop computer, a laptop computer, a mobile computing device, a tablet, a digital media, or entertainment device, or any other type of electronic device. The IHS 870 may include at least a processor 872, a memory 874, and an interface 878. The interface 878 may be configured to enable communication between the IHS 870 and the gaming controller 850, communication between the IHS 870 and the display 890, or both. The processor 872 may be configured to execute instructions stored at the memory 874 to cause the IHS 870 to perform the operations described here. In some implementations, the IHS 870 can be configured to access a wireless network or the internet (e.g., via an application on the IHS 870) or to access a web application or web service hosted by a server, and thereby provide a user interface for enabling a user to access an application 876.

In some configurations, the IHS 870 is configured to act as an intermediary between the gaming controller 850 and the display 890. For example, the IHS 870 may receive a user input from the gaming controller 850 (e.g., at the button 800) and transmit and/or process the user input to the display 890 to change the displayed environment (e.g., navigation between icons, rotating a point of view of a character, select a visual prompt, or otherwise changing the display environment). In some configurations, the IHS 870 is configured to send instructions (e.g., signals) to the gaming controller 850 to transmit information to the user. For example, based on a programmable setting of the application 876, the IHS 870 may transmit one or more instructions to cause one or more of the buttons 800 to extend or retract. Additionally, or alternatively, the application 876 may cause the IHS 870 to transmit instructions to the gaming controller 850 to cause one or more of the buttons 800 to extend or retract. For example, the application 876 may allow a user to control a character in a gaming environment. When the character crawls into a small area (e.g., into a tunnel) or under a structure, the IHS 870 and/or the application 876 can determine that the movement of the character is hindered in a way that prevents the character from jumping and running. Based on this determination, the IHS 870 can transmit a retract signal to the button 800 that controls the character's jumping and transmit a retract signal to the button 800 that controls the character's running. In other words, the IHS 870 can transmit a retract signal to the button 800 in response to a game event to communicate to a user that a certain function in the game is temporarily disabled. In this way, the user may be informed (e.g., via the retraction or extension of the buttons) of the disabled functions in a manner that is impossible with conventional gaming controllers. As another example, the IHS 870 and/or the application 876 can determine that only certain buttons are used while playing a particular game, and transmit a retract signal to the buttons 800 that are not used. Similarly, in some configurations, the IHS 870 and/or the application 876 can determine that the retracted buttons 800 are required for a particular game or required for a part of a game, and transmit an extend signal to the retracted buttons 800 so that the user is able to manipulate them. Moreover, the user may initiate the extension or retraction of the buttons 800. In this way and others, the system 840 and the button 800 may enable application developers to include a more immersive experience by providing more feedback to the users.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 12:
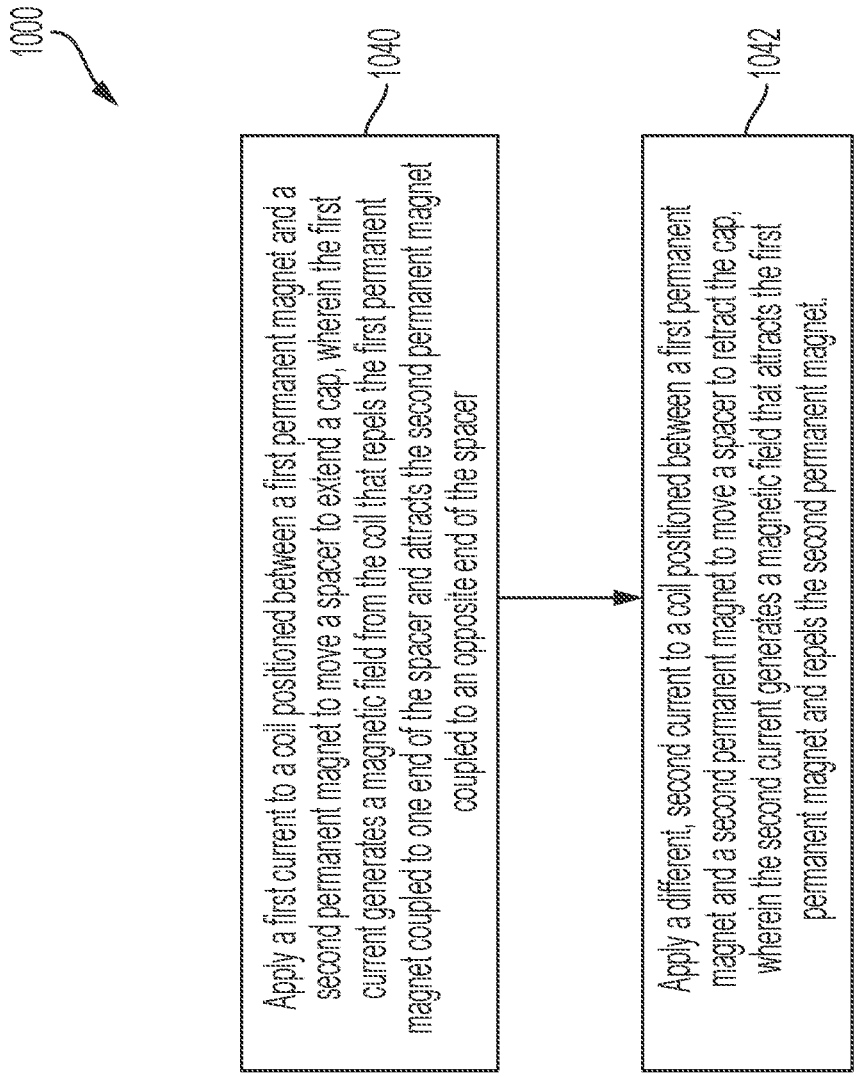
FIG. 12 shows a flow diagram of an example of a method of operating an example of a button according to one or more aspects of the present disclosure.

Referring now to FIG. 12, shown is an example of a method of operating a button according to one or more aspects of the present disclosure. A method 1000 of operating a button, such as the button 100, the button 200, the button 300, the button 400, or the button 800, is shown. The method 1000 may be performed at, by, or with the button 100, the button 200, the button 300, the button 400, the button 800, or one or more of the components of any of these. The method 1000 includes a block 1002: applying a first current to a coil (e.g. 108, 208, 308, 408) positioned between a first magnet (e.g. 104, 204, 304, 404) and a second magnet (e.g. 110, 210, 310, 410) to move a spacer (e.g. 106, 206, 306, 406) to extend a cap (e.g. 102, 202, 302, 402), in which the first current generates a magnetic field from the coil that repels the first magnet coupled to one end of the spacer and attracts the second magnet coupled to an opposite end of the spacer. The method 1000 further includes a block 1002: applying a different, second current to the coil positioned between the first magnet and the second magnet to move the spacer to retract the cap, in which the second current generates a magnetic field that attracts the first magnet and repels the second magnet.

In some configurations, the method 1000 can include—but need not include—a block: latching a magnetic core (e.g. 214, 414) to the second magnet to fix the spacer in an extended position, and a block: latching the magnetic core to the first magnet to fix the spacer in a retracted position.

In some configurations, the method 1000 can include—but need not include—a block: receiving an input from an information handling system (e.g. 870) in which the first current is applied when the input is a first input and the second current is applied when the input is a second input.

The method 1000 may be embedded in a computer-readable medium as computer program code comprising instructions that cause a processor to perform operations corresponding to the blocks of the method. In some configurations, the processor may be part of an information handling system including a first network adaptor configured to transmit data over a first network connection, and a processor coupled to the first network adaptor, and the memory.

The above specification and examples describe the structure and use of illustrative implementations. Although certain examples have been described above with some particularity, or with reference to one or more individual examples, those skilled in the art could alter the disclosed implementations without departing from the scope of this invention. Thus, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form more examples having comparable or different properties and/or functions, and addressing the same or different problems. Similarly, it will be understood that the benefits and advantages described above may relate to one embodiment or may relate to several implementations.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions in firmware. Further, the logic circuity may be configured as a general-purpose processor capable of executing instructions in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that a computer can access. By way of example, and not limitation, such computer-readable media can comprise random access memory (RAM), read-only memory (ROM), electrically-erasable programmable read-only memory (EEPROM), or other optical disk storage, magnetic disk storage or other magnetic storage devices, or any other medium that can be used to store desired program code in the form of instructions or data structures and that can be accessed by a computer. Combinations of the above should also be included within the scope of computer-readable media. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions, and alterations could be made without departing from the spirit and scope of the disclosure as defined by the appended claims. Moreover, the scope of the present application is not intended to be limited to the particular embodiments of the process, machine, manufacture, composition of matter, means, methods, and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described here may be utilized. Accordingly, the appended claims are intended to include within their scope such processes, machines, manufacture, compositions of matter, means, methods, or steps.

The invention claimed is:

1. An apparatus, comprising:
 a first magnet;
 a second magnet;
 a coil positioned between the first magnet and the second magnet;
 a spacer coupled at one end to the first magnet, coupled at an opposite end to the second magnet, and configured to arrange the first magnet on one side of the coil and the second magnet on an opposite side of the coil; and
 a cap coupled to the spacer over the first magnet, wherein the first magnet, the second magnet, the coil, the spacer, and the cap are part of a first button, and wherein the apparatus comprises an array of buttons including the first button.

2. The apparatus of claim 1, further comprising a haptic component coupled to the cap and the first magnet.

3. The apparatus of claim 1, further comprising a magnetic core positioned between the first magnet and the second magnet, wherein at least a portion of the coil is positioned around the magnetic core.

4. The apparatus of claim 3, wherein the magnetic core comprises iron.

5. The apparatus of claim 1, further comprising:
 a first backing plate coupled to the first magnet; and
 a second backing plate coupled to the second magnet.

6. The apparatus of claim 1, further comprising:
 a controller coupled to the coil, wherein the controller is configured to:
  apply a first current to the coil; and
  apply a different, second current to the coil.

7. The apparatus of claim 6, wherein the controller is configured to:
 extend the cap by applying the first current to the coil to generate a magnetic field that repels the first magnet and attracts the second magnet; and
 retract the cap by applying the second current to the coil to generate a magnetic field that attracts the first magnet and repels the second magnet.

8. The apparatus of claim 7, further comprising a magnetic core positioned between the first magnet and the second magnet, wherein at least a portion of the coil is positioned around the magnetic core, and wherein the controller is configured to:
 apply the first current to the coil as a current pulse; and
 apply the second current to the coil as a current pulse.

9. The apparatus of claim 8, wherein the controller is configured to apply the second current with an amplitude and a duration to maintain the magnetic core and the first magnet fixed relative to each other when the second current is removed from the coil.

10. The apparatus of claim 1, wherein the first button further comprises a haptic component positioned between the cap and the first magnet.

11. The apparatus of claim 1, further comprising:
 a printed circuit board coupling the buttons of the array of buttons; and
 a housing at least partially enclosing the printed circuit board;
 wherein at least one button of the array of buttons is configured to be independently extended or retracted relative to at least one of the printed circuit board or the housing.

12. The apparatus of claim 1, further comprising:
 a controller coupled to the array of buttons, wherein the controller is configured to:
  independently extend at least one button of the array of buttons by applying a first current to a coil of the at least one button to generate a first magnetic field that repels a first magnet of the at least one button and attracts a second magnet of the at least one button; and
  independently retract the at least one button by applying a second current to the coil of the at least one button to generate a second magnetic field that attracts the first magnet of the at least one button and repels the second magnet of the at least one button.

13. A gaming controller, comprising:
an array of buttons, at least one button of the array of buttons configured to extend to a first configuration and retract to a second configuration, the at least one button comprising:
  a first magnet;
  a second magnet;
  a coil positioned between the first magnet and the second magnet;
  a spacer coupled at one end to the first magnet, coupled at an opposite end to the second magnet, and configured to arrange the first magnet on one side of the coil and the second magnet on an opposite side of the coil; and
  a cap coupled to the spacer over the first magnet; and
a controller coupled to the array of buttons, wherein the controller is configured to:
  extend the at least one button of the array of buttons by applying a first current to the coil to generate a magnetic field that repels the first magnet and attracts the second magnet;
  extend the at least one button of the array of buttons by applying a second current to the coil to generate a magnetic field that attracts the first magnet and repels the second magnet; and
  determine user input to the array of buttons.

14. The gaming controller of claim 13, wherein:
the array of buttons comprises at least one second button configured to extend to a third configuration and retract to a fourth configuration; and
the controller is configured to reconfigure at the same time the at least one button between the first configuration and the second configuration and the at least one second button between the third configuration and the fourth configuration.

15. The gaming controller of claim 13, wherein the at least one button further comprises a magnetic core positioned between the first magnet and the second magnet, and wherein at least a portion of the coil is positioned around the magnetic core.

16. The gaming controller of claim 13, wherein the controller is configured:
  to apply a first profile to extend a first set of one or more buttons of the array of buttons and retract a second set of one or more buttons of the array of buttons; and
  to apply a second profile to extend a third set of one or more buttons of the array of buttons and retract a fourth set of one or more buttons of the array of buttons.

17. A method, comprising:
applying a first current to a coil positioned between a first magnet and a second magnet to move a spacer to extend a surface of a first button comprising a cap coupled to the spacer over the first magnet, wherein the first current generates a magnetic field from the coil that repels the first magnet coupled to one end of the spacer and attracts the second magnet coupled to an opposite end of the spacer, wherein the first magnet, the second magnet, the coil, the spacer, and the cap are part of the first button, and wherein the first button is one of an array of buttons including the first button; and
applying a different, second current to the coil to move the spacer to retract the surface of the button, wherein the second current generates a magnetic field that attracts the first magnet and repels the second magnet.

18. The method of claim 17, further comprising:
latching a magnetic core to the second magnet to fix the spacer in an extended position; and
latching the magnetic core to the first magnet to fix the spacer in a retracted position.

19. The method of claim 18, further comprising receiving an input from an information handling system, wherein the first current is applied when the input is a first input and wherein the second current is applied when the input is a second input.

* * * * *